US010614794B2

(12) United States Patent
Qian et al.

(10) Patent No.: US 10,614,794 B2
(45) Date of Patent: Apr. 7, 2020

(54) ADJUST OUTPUT CHARACTERISTIC

(71) Applicant: Lenovo (Singapore) Pte. Ltd., Singapore (SG)

(72) Inventors: Ming Qian, Cary, NC (US); John Weldon Nicholson, Cary, NC (US); Jatinder Kumar, Cary, NC (US); Jun-Ki Min, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/624,094

(22) Filed: Jun. 15, 2017

(65) Prior Publication Data
US 2018/0366104 A1 Dec. 20, 2018

(51) Int. Cl.
*G10L 13/033* (2013.01)
*G10L 15/22* (2006.01)
*G06F 3/16* (2006.01)
*G10L 13/00* (2006.01)

(52) U.S. Cl.
CPC ............ *G10L 13/033* (2013.01); *G06F 3/167* (2013.01); *G10L 15/22* (2013.01); *G10L 13/00* (2013.01); *G10L 2015/226* (2013.01)

(58) Field of Classification Search
None
See application file for complete search history.

(56) References Cited

U.S. PATENT DOCUMENTS

| | | | | |
|---|---|---|---|---|
| 7,415,100 B2* | 8/2008 | Cooper | ................. | H04M 3/527 379/88.01 |
| 9,495,129 B2* | 11/2016 | Fleizach | ................. | G06F 3/167 |
| 2004/0034528 A1* | 2/2004 | Sakai | .................... | G10L 15/285 704/258 |
| 2007/0094029 A1* | 4/2007 | Saito | ..................... | G10L 13/033 704/260 |
| 2014/0006030 A1* | 1/2014 | Fleizach | ................. | G06F 3/167 704/260 |
| 2014/0282003 A1* | 9/2014 | Gruber | .................... | G06F 3/165 715/727 |
| 2015/0067516 A1* | 3/2015 | Park | ........................ | G06F 3/167 715/728 |
| 2016/0086597 A1* | 3/2016 | Matsubara | ............ | G10L 13/027 704/243 |
| 2017/0083281 A1* | 3/2017 | Shin | ........................ | G10L 13/00 |
| 2017/0206095 A1* | 7/2017 | Gibbs | ..................... | G06F 3/167 |
| 2018/0114521 A1* | 4/2018 | Hwang | ................. | G10L 13/033 |

* cited by examiner

*Primary Examiner* — Jonathan C Kim
(74) *Attorney, Agent, or Firm* — Ference & Associates LLC

(57) ABSTRACT

One embodiment provides a method, including: receiving, at an information handling device, a query from a user; receiving an indication of a time associated with provision of a result associated with the query; and adjusting a characteristic associated with an audible output based upon the indicated time. Other aspects are described and claimed.

5 Claims, 3 Drawing Sheets

ADJUST OUTPUT CHARACTERISTIC

BACKGROUND

Information handling devices ("devices"), for example smart phones, tablet devices, smart speakers, laptop and personal computers, and the like, may be capable of receiving command inputs and providing outputs responsive to the inputs. Generally, a user interacts with a voice input module, for example embodied in a personal assistant through use of natural language. This style of interface allows a device to receive voice inputs from a user (e.g., queries, commands, etc.), process those inputs, and provide audible outputs according to preconfigured output settings (e.g., preconfigured output speed, etc.).

BRIEF SUMMARY

In summary, one aspect provides a method, comprising: receiving, at an information handling device, a query from a user; receiving an indication of a time associated with provision of a result associated with the query; and adjusting a characteristic associated with an audible output based upon the indicated time.

Another aspect provides an information handling device, comprising: a processor; a memory device that stores instructions executable by the processor to: receive a query from a user; receive an indication of a time associated with provision of a result associated with the query; and adjust a characteristic associated with an audible output based upon the indicated time.

A further aspect provides A product, comprising: a storage device that stores code, the code being executable by a processor and comprising: code that receives a query from a user; code that receives an indication of a time associated with provision of a result associated with the query; and code that adjusts a characteristic associated with an audible output based upon the indicated time.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
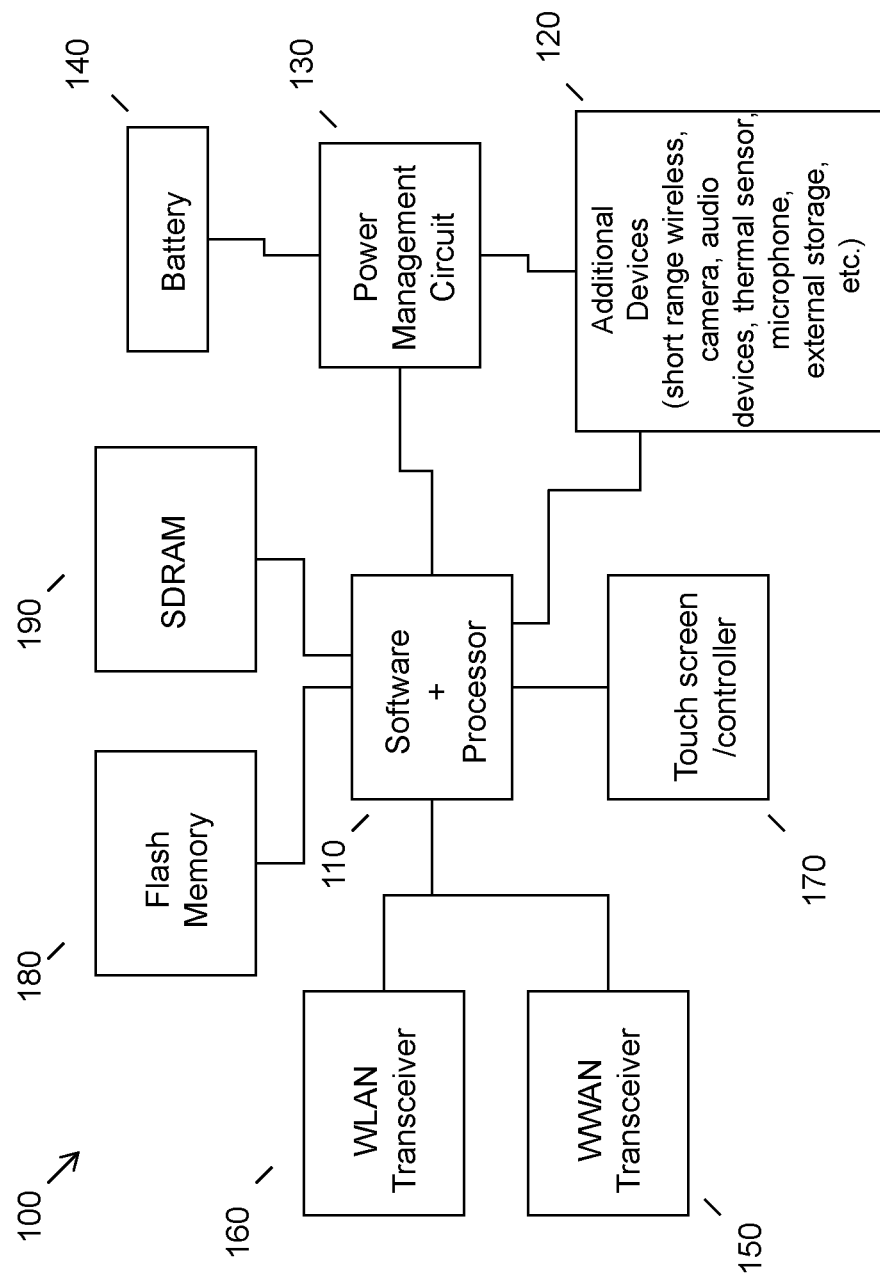
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide outputs (e.g., audible outputs, visual outputs, etc.) that are responsive to a variety of different types of user inputs (e.g., voice inputs, etc.).

Conventionally, digital assistants may provide output at a single uniform speed and summary level. However, these conventional methods of providing output do not consider a user's contextual situation and are unable to identify any time constraints the user may currently be under (e.g., if the user is in a hurry, etc.) and adjust the output accordingly. For example, responsive to receiving a query from User A, a conventional digital assistant may identify an output response that would take 5 minutes to provide under the device's current settings (i.e., at output speed X.). If User A needs to leave in 3 minutes, the device would still provide the output using output speed X, regardless of the fact that User A would leave before the entirety of the output was provided. Additionally, conventional methods are unable to mimic natural language conversation and incorporate pauses and stalls when processing user input to retrieve output results.

Although existing solutions allow the output settings to be adjusted, this requires additional action from a user (e.g., manually reconfiguring output speed settings in an application, etc.) and cannot be done dynamically (e.g., in response to an identified time constraint, etc.). Furthermore, adjusting the settings may not be intuitive or easy and many users may be unaware of how to adjust these settings and may be forced to receive output at the current or default output setting. Additionally, conventional digital assistant programming does not allow the digital assistant to perform pause and stalling functions. For example, if the results of the provided query are not readily available, conventional digital assistants provide no indication of this fact.

Accordingly, an embodiment provides a method for automatically adjusting a characteristic based upon a time associated with provision of a result of a query. In an embodiment, a query may be received at a device from a user. An embodiment may then receive an indication of a time associated with provision of a result associated with the query. For example, the indication may be received by accessing an accessible data storage source to identify the time. Subsequent to receiving the indication, an embodiment may then adjust a characteristic (e.g., increase the output speed, incorporate a delay or a stall in provision of the output, etc.) based upon the indicated time. Such a method may enable a user under a time constraint to receive output at a quicker speed and/or receive a summarized version of the output. Additionally, such a method may enable a digital assistant disposed on a device to mimic natural language conversation with the user by incorporating pauses and/or stalls in the provision of the output.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
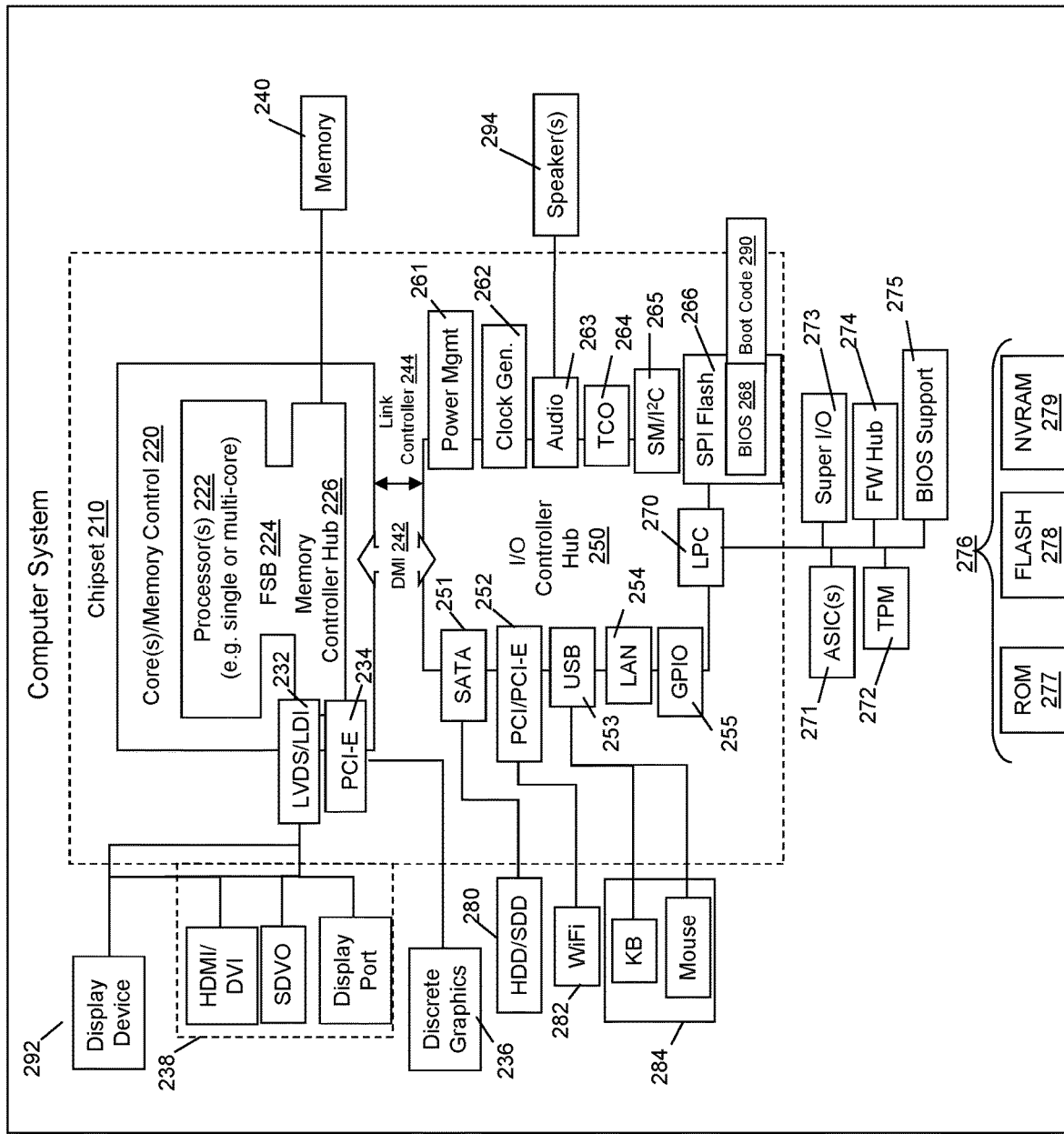
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
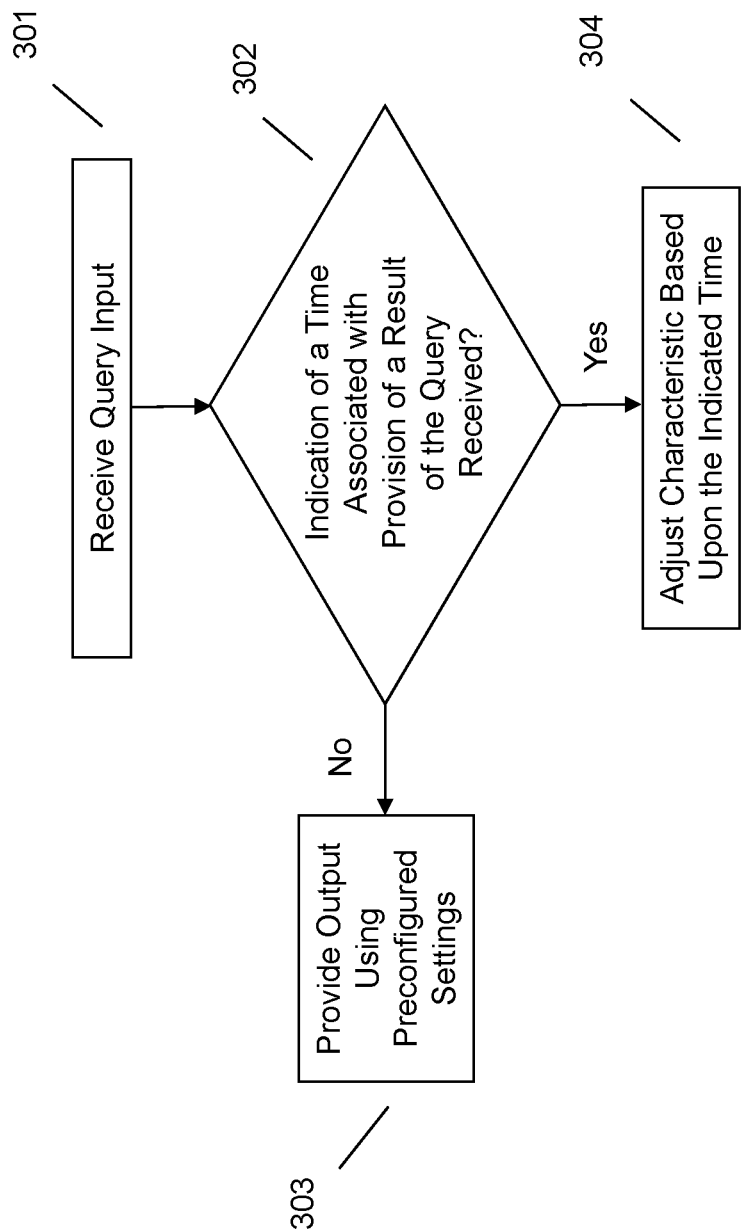
FIG. 3 illustrates an example method of adjusting a characteristic based upon a time associated with provision of a result of a query.

Referring now to FIG. 3, an embodiment may adjust a characteristic of an audible output based upon a time associated with provision of a result of a query. At 301, an embodiment may receive query input from at least one user. For example, the user may provide query input to a digital assistant that the user wants the digital assistant to process and provide output to. The input may be received at an input device (e.g., physical keyboard, on-screen keyboard, audio capture device, image capture device, video capture device, etc.) and may be provided by any known method of providing input to an electronic device (e.g., touch input, text input, voice input, etc.). For simplicity purposes, the majority of the discussion herein will involve voice input that may be received at an input device (e.g., a microphone, a speech capture device, etc.) operatively coupled to a speech recognition device. However, it should be understood that generally any form of user input may be utilized. In an embodiment, the speech recognition device may or may not contain a display screen.

In an embodiment, the input device may be an input device integral to the speech recognition device. For example, a smart phone may be disposed with a microphone capable of receiving voice input data. Alternatively, the input device may be disposed on another device and may transmit received voice input data to the speech recognition device. For example, voice input may be received at a smart speaker that may subsequently transmit the voice data to another device (e.g., to a user's smartphone for processing, etc.). Voice input data may be communicated from other sources to the speech recognition device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the speech recognition device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

At 302, an embodiment may receive an indication of a time associated with provision of a result associated with the query. A result associated with the query may include any output that may be provided by the information handling device or digital assistant. For example, the result may include products from the user's query (e.g., search results, instructional output, directional output, etc.). In an embodiment, the time may be a deadline at which output associated with the query results must be provided by and the indication may be a notification to the device of the deadline. In another embodiment, the indication of the time may be an indication of an amount of time for the digital assistant to provide an output. For example, the digital assistant may identify the time required to process and provide an output or result to the query. As another example, the digital assistant may identify a delay or pause in the provision of some or all of the result. In an embodiment, the indication may be received from user input or, alternatively, may be determined by the device dynamically.

The indication may be received at any point during the interactive session with the device. For example, the indication may be received while the user is providing input the device, while the device is processing the input, while the device is providing output, or the like. To receive the indication an embodiment may access an accessible data storage source (e.g., a user's calendar, stored messages, social media, other types of context data associated with the user, etc.) to identify any upcoming events (e.g., upcoming meetings, phone calls, etc.) that may conflict with the provision of the output if the output is provided under the current output settings. If such an event is identified, the indication may comprise the event or the time associated with the event. Thus, an embodiment may determine how long the system has to any output results based upon the time associated with the event.

In another example, the indication of a time may be received as part of the user's query. For example, a user may provide the following query to a digital assistant, "I need the directions to Building A in the next 20 seconds", in which the designation, "the next 20 seconds," acts as the indication. In yet another example, responsive to receiving a user query, a device may estimate how long it will take to process the user's query and return corresponding results (e.g., a device may estimate how long it will take to retrieve search results associated with the query, etc.). In this situation, the indication may comprise the estimated time to retrieve the result(s).

In an embodiment, the indication may be received during the provision of the output. For example, while providing results responsive output to a user's query, an embodiment may receive one of following additional user inputs: "hurry up", "slow down", "provide me with the results faster", and the like. In an embodiment, the indication may be received during the provision of the output without the receipt of any additional audible user input. For example, while providing responsive output to a user's query, an embodiment may identify (e.g., by accessing a data store associated with the user, etc.) that a new event has just been added to a user's calendar (e.g., by another user, etc.) that may affect the provision of the output at the current output settings.

In an embodiment, the received indication may be indicative of a delay associated with accessing and/or receiving results associated with the query. For example, responsive to receiving a query to provide search results, an embodiment may encounter a delay in the attainment and/or provision of the results. In an embodiment, the indication of a delay may comprise an indication of a short delay (e.g., 2 seconds, 10 seconds, etc.) or a long delay (e.g., 1 minute, 5 minutes, etc.). For example, a user may provide a complex query that takes the device additional time to process and retrieve the results. The device may then identify that it will take additional time to provide the results to the user and identify an estimated processing time. This estimated processing time may be used as the indication of time.

Responsive to receiving, at 302, an indication of a time associated with provision of a result of a query, an embodiment may adjust, at 304, a characteristic associated with audible output based upon the indicated time. In an embodiment, the speech recognition device, or another device associated with the speech recognition device, may provide output to a user. The output may be audio output, visual output, a combination thereof, or the like. In an embodiment, the audible output may be provided through a speaker, another output device, and the like. In an embodiment, the visual output may be provided through a display screen, another display device, and the like. In an embodiment, the output device may be integral to the speech recognition device or may be located on another device. In the case of the latter, the output device may be connected via a wireless or wired connection to the speech recognition device. For example, a smart phone may provide instructions to provide audible output through an operatively coupled smart speaker.

In an embodiment, the adjustment of an output characteristic may comprise the adjustment of an output speed. In an embodiment, responsive to identifying that the entirety of the output cannot be provided in the indicated time using the current output settings, an embodiment may adjust the speed of the output. For example, responsive to receiving a query from User A, an embodiment may identify an output response that may take 5 minutes to provide at the current output speed. If an indicated time for the output was 3 minutes (e.g., because the user has a meeting in 3 minutes, etc.), an embodiment may increase the output speed in order to provide the output within the indicated time. In the same vein, an embodiment may also decrease the output speed responsive to identifying that the entirety of the output will be provided well in advance of the indicated time. An embodiment may also adjust the output speed responsive to identifying certain keywords in the user input such as "quickly", "slowly", etc. and perform a corresponding function associated with the keyword (e.g., the keyword "quickly" may indicate to increase the output speed, the keyword "slowly" may indicate to decrease output speed, etc.).

If an embodiment determines that the output speed required to provide the output within the indicated time comprises an unreasonable output speed (i.e., a speed at which a user could not adequately or comfortably understand the output), then an embodiment may provide a notification to the user. The notification, for example, may comprise a suggestion from the device to receive the output at another time when the user is not under such a time constraint. Alternatively, an embodiment may use another technique for providing the results under the time constraint, for example, adjusting the length of output, providing partial output, or the like, as discussed in more detail below.

In an embodiment, the adjustment of an output characteristic may comprise the incorporation of a pause as part of the output. In an embodiment, responsive to receiving an indication of a long delay associated with the attainment of query results, an embodiment may adjust a characteristic to incorporate a pause until the results are retrieved. The pause may be a moment where no output is provided (e.g., a time period where the digital assistant remains silent, etc.). In an embodiment, the pause may be a preconfigured length (e.g., 15 seconds, 30 seconds, etc.) or, alternatively, the pause may last until the results have been obtained. The pause may also include a provision of some indication of the necessity for a pause. For example, an embodiment may provide output indicating that the results are taking longer to process, so the results will be forthcoming shortly. As an example, an embodiment may provide output stating "please wait a moment while I access those results." The output may also include provision of some other output while the user is waiting for the results, for example, music, a graphic or icon indicating the system is processing, or the like.

In an embodiment, the adjustment of an output characteristic may comprise stalling. In an embodiment, responsive to receiving an indication of a short delay associated with the attainment of query results, an embodiment may adjust a characteristic to stall until the results are accessed or ready to be provided. In an embodiment, the stalling may comprise slowing down a speed of the output based upon the expected delay. For example, an embodiment may be providing part of the output and determine that access to another portion of the output will be subjected to a short delay. Accordingly, the device may slow down the provision of the part of the output currently be provided until the remaining portion can be accessed. In another embodiment, the stalling may comprise providing a longer version of the output result. For example, the device may lengthen the output currently being provided. In yet another embodiment, the stalling may comprise the incorporation of "filler words" into the output result. For example, instead of immediately outputting the content of the results, an embodiment may begin the output with a stalling phrase such as "Thank you for asking me the question, the results I found are . . . ", "Well User A, I believe . . . ", and the like. In yet another embodiment, the digital assistant may communicate to the user that some delay is to be expected in the output by providing a notification such as "I'm having trouble finding an answer for you right now, this may take a few moments."

In an embodiment, the adjustment of an output characteristic may comprise the adjustment of the output content. In an embodiment, responsive to identifying that the entirety of the output cannot be provided in the indicated time using the current output settings, an embodiment may identify a plurality of different versions (e.g., short answer, long answer, full answer, etc.) of the output result where each version comprises a different length. An embodiment may then choose the version of the output that is able to be provided within the indicated time. For example, where an indicated time comprises 1 minute, an embodiment may identify three result possibilities A, B, and C, where result A takes 45 seconds to provide, result B takes 1 minute and 30 seconds to provide, and result C takes 2 minutes to provide. Based upon the indicated time, an embodiment may identify that result A is able to be provided within the indicated time and may then output the content associated with result A.

In an embodiment, responsive to identifying that the entirety of the output cannot be provided in the indicated time using the current output settings, an embodiment may summarize the output content (e.g. by utilizing automatic document summary techniques, etc.). The summarized version of the output may be provided to the user in lieu of the full output. Additionally, the extent of the summary may be dynamically adjusted based upon the identified time. For example, when the indicated time is imminent, the summary may be very short (e.g., only key words provided in bullet point form, etc.) whereas if the indicated time is not as imminent the summary may be longer (e.g., paragraph form summarization, etc.).

In an embodiment, at least one break point in the result associated with the indicated time may be identified and output of the result may be provided up until the break point. For example, an embodiment may receive a user command to provide instructional output associated with the construction of an object (e.g., assembly of a table, etc.). The instructional output may comprise a multitude of steps and an embodiment may determine that the object assembly may take a total of one hour to complete. Responsive to receiving an indication that the entirety of the output cannot be provided in one session (e.g., because a user only has 30 minutes before they need to leave to an appointment, etc.), an embodiment may identify a point after one of the multitude of steps as an appropriate break point in the provision of the output. Stated differently, an embodiment may identify a point in the construction of the object that a user can comfortably stop at in order to attend to their other matter. When the user desires to continue receiving instructional output, an embodiment may then resume provision of the output from the break point. In an embodiment, the identification of the break point may occur before, or during, the provision of the instructional output.

Adjusting the characteristic associated may be based upon user preferences. For example, one user may prefer that the device notify the user in the case of a delay in provision of results, while another user may prefer that the device not provide any indication of the delay in provision of the results. As another example, one user may prefer the device auto-summarize the results to shorten the time associated with provision of the output, while another use may prefer that the device choose a shorter version of the results. To provide the user preferences, the user may select different options or otherwise provide an indication of the preference. Alternatively or additionally, the device may learn the user's preferences. For example, if a user always indicates that the device should increase the speed of the output provision as opposed to summarizing the results, the device may learn this preference. Upon receiving subsequent inputs and an indication of a time, the device may adjust the characteristic in accordance with the learned preference for that user. Accordingly, the system may also store user profiles associated with particular and identified users in order to adjust the characteristics for each user as the dictated by the user's preferences.

Responsive to not receiving, at 302, an indication of a time associated with provision of a result of a query, an embodiment may provide, at 303, output using preconfigured and/or existing output settings. For example, an embodiment may provide output at a pre-configured or existing speed. In other words, an embodiment may make no attempt to change the time associated with provision of the output.

The various embodiments described herein thus represent a technical improvement to conventional output techniques. Using the techniques described herein, an embodiment may receive an indication of a time associated with provision of a result of a user query. An embodiment may then adjust a characteristic associated with an audible output based upon the indicated time. Such techniques enable a device to accommodate any time constraints faced by a user or the device when providing output to the user. Additionally, these techniques will enable a device to more naturally communicate with the user when processing user query input by incorporating stalls and/or delays in the output.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:
1. A method, comprising:
  receiving, at an information handling device, a query from a user;
  receiving, from a source that is not the user, an indication of a deadline time by which to provide a result responsive to the query at a current output setting, wherein the source comprises a calendaring application associated with the user and the indication of the deadline time is determined based upon an upcoming event scheduled in the calendaring application;

determining, using a processor, that a length of time required to provide the result at the current output setting is greater than the deadline time;

identifying, responsive to the determining, a break point in the result based at least upon the deadline time and the length of time; and providing, at the current output setting, a portion of the result up to the break point.

2. The method of claim 1, wherein the receiving the indication comprises accessing an accessible data storage source to identify the deadline time.

3. An information handling device, comprising:

an output device associated with the information handling device;

a processor;

a memory device that stores instructions executable by the processor to:

receive a query from a user;

receive, from a source that is not the user, an indication of a deadline time by which to provide a result responsive to the query at a current output setting, wherein the source comprises a calendaring application associated with the user and the indication of the deadline time is determined based upon an upcoming event scheduled in the calendaring application determine that a length of time required to provide the result at the current output setting is greater than the deadline time;

identify, responsive to the determining, a break point in the result based at least upon the deadline time and the length of time; and provide, at the current output setting, a portion of the result up to the break point.

4. The information handling device of claim 3, wherein the instructions executable by the processor to receive the indication comprise instructions executable by the processor to access an accessible data storage source to identify the deadline time.

5. A product, comprising:

a storage device that stores code, the code being executable by a processor and comprising:

code that receives a query from a user;

code that receives, from a source that is not the user, an indication of a deadline time by which to provide a result responsive to the query at a current output setting, wherein the source comprises a calendaring application associated with the user and the indication of the deadline time is determined based upon an upcoming event scheduled in the calendaring application;

code that determines that a length of time required to provide the result at the current output setting is greater than the deadline time;

code that identifies, responsive to the determining, a break point in the result based at least upon the deadline time and the length of time; and code that provides, at the current output setting, a portion of the result up to the break point.

* * * * *